WHELPLEY & STORER.
Ore Separator.
No. 48,226.  Patented June 13, 1865.
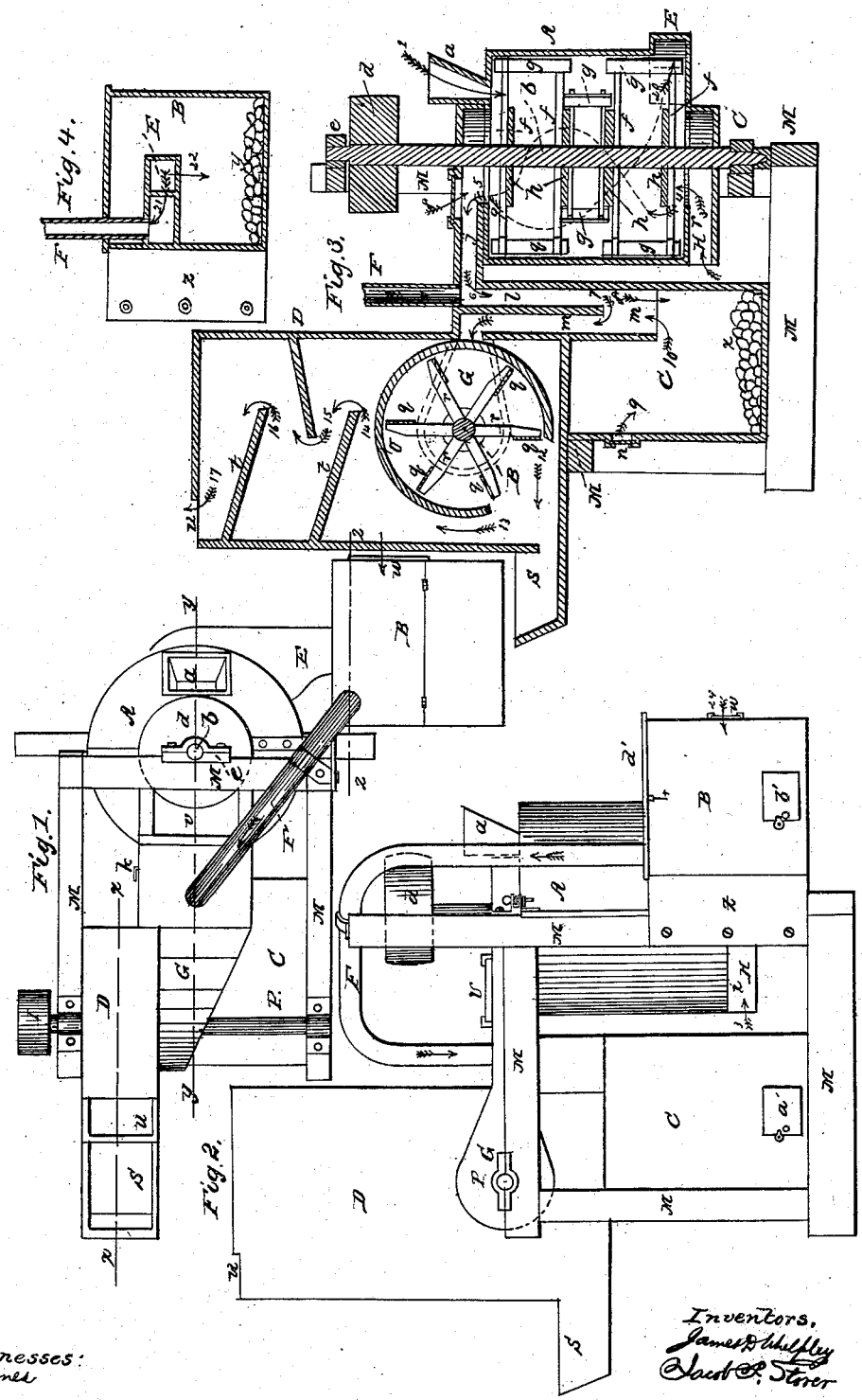

UNITED STATES PATENT OFFICE.

J. D. WHELPLEY AND JACOB J. STORER, OF BOSTON, MASS.

IMPROVED APPARATUS FOR SEPARATING METALS FROM ORES.

Specification forming part of Letters Patent No. 48,226, dated June 13, 1865.

*To all whom it may concern:*

Be it known that we, J. D. WHELPLEY and J. J. STORER, of Boston, in the county of Suffolk and State of Massachusetts, have invented a new and useful Method of Separating Metals from Ores and Cinders; and we do hereby declare that the following is a full, clear, and exact description of the construction and operation of the same, reference being had to the accompanying drawings, forming a part of this specification, in which—

Figure 1 is a top view. Fig. 2 is a side elevation. Fig. 3 is a vertical section in the lines $x\,x$ and $y\,y$ of Fig. 1; and Fig. 4 is a vertical section in the line $z\,z$ of Fig. 1.

Like parts are indicated by the same letters in all the drawings.

The purpose of our invention is to separate metal from earthy and other substances in which it is diffused in small particles—as, for example, native gold from pulverized quartz and other rock in which its particles are diffused, also from the sands of rivers and hillsides, and from any artificial ash, cinders, or other product of metallurgical process with which it may be mixed in small grains—dispensing in part with the use of mercury and chemical reagents, and otherwise shortening and simplifying the process of metallic separation until by the process hereinafter described all but a small percentage of earth and other foreign substance shall be removed from the metal; also, to separate metallic copper from the rock in which its particles are diffused and from slags and furnace-cinder generated in the process of copper-working, and in the partial separation of copper from its ores by the action of heat; also, to separate brass and other alloys and metals from furnace cinder and ashes, and the remains of crucibles, and from the refuse of foundries and the ash and cinders of furnaces, as well as particles of iron from the same; and the nature of our invention consists, first, in the application of gravity in counteraction to currents of air, while the mixture of earth and metal is confined in an upright mill, the air moving upward to carry off the fine dust of earthy matter and other impurities, while the metal falls by its superior gravity downward along the sides of the cylinder of the mill; second, in separating such portions of metallic dust as may be carried off from the mill by a current of air through the same, which object we effect by causing the current of air from said mill to pass through a vertical, inclined, or horizontal pipe, the extremity of which is inclosed within a larger and longer one into or over a pocket or chamber, and thence upward through the aforesaid larger and longer pipe leading from said pocket, the heavier metallic particles in the descending current shooting or falling downward from the first-mentioned pipe to the bottom of said pocket, where they are deposited, while the earthy floating dust is prevented from entering the pocket by an auxiliary current of air entering at a windage-door, and is carried upward by the ascending current of air through the second pipe into a suitable receptacle, the principle of separating being the same in both cases—*i. e.*, gravity or momentum opposed to a current of air—the same arrangement being duplicated and repeated as often as may be required, so as to form a series of pockets, each in succession retaining a finer grade of metallic deposit.

Our invention further consists in the employment of a water-tank and spray-wheel (to be also used as the draft-wheel of the apparatus) in the exit or chimney, through which the current of air is discharged from the separating apparatus, whereby the floating dust separated from the metal is wet down and deposited on the bottom of said tank, the object of the wetting being to prevent nuisance from the diffusion of dust in the atmosphere.

To enable others skilled in the art to use our method of separating metals, &c., we will now describe the same and the machine or apparatus by means of which we carry our improvement into practical operation.

The ore of copper, gold, or other metal containing the free particles of metal is first concentrated and broken in the usual manner, throwing out as much as possible of the refuse matter. If any large masses of metal occur, they are now separated by screening and thrown aside. The remainder, containing only fine particles or metallic dust, is then crushed or ground by stamps or other machines as fine as possible. If any metal can still be separated by screening, it is done. The remainder is then fed into the cylinder of the separator.

The same preliminary process must be gone through in the preparation of furnace slag, cinders, "frit," or ashes obtained as refuse from other metallurgical processes or purposely obtained for the present process.

The drawings represent an apparatus or machine by means of which the principle of our improvement is carried into practical operation.

M is a wooden frame for supporting the different parts of the apparatus.

A is an upright cylinder, of iron, constituting the shell of the mill, which is made in two parts and hinged together, as shown in Figs. 1 and 2, and confined by a hasp, so that it may be readily opened for the purpose of inspecting and repairing the working parts inclosed within.

$b$ is the vertical shaft, turning in suitable bearings, $e$ and $c$, at the top and bottom, supporting the system of air-wheels, (to be described,) and driven by means of the pulley $d$.

$h\ h\ h\ h$ are the air-wheels, consisting of disks of iron, (fast to the shaft,) radial arms $f$, and fans $g$, as shown in Fig. 3.

$a$ is the hopper into which the material is thrown, and from which it is fed into the mill by any suitable mechanism.

$v$ is a sliding valve, by means of which the air-port over the top of the mill may be opened or closed for the purpose hereinafter described. At the side and bottom of the mill or cylinder A is a tangential opening or conductor, E, the shape and position of which are clearly shown in Figs. 1, 3, and 4. This conductor leads horizontally into a closed chamber or pocket, B, as represented in Figs. 1 and 3, provided with a hinged cover, $d'$, sliding valve $w$, and door $b'$.

H is an air-port or conductor under the mill, and provided with a valve, $i$, the operation of which will be hereinafter explained.

F is a pipe leading from the top of the pocket or chamber B into the horizontal conductor $j$, which leads from the top of the mill into the vertical pipe or conductor $l$, which latter opens into the larger vertical conductor $m$, as represented in Fig. 3, in the close chamber or pocket C.

$n$ is a sliding valve, by opening which a current of air (more or less) is admitted into the pocket C.

$a'$ is a side door at the bottom of the pocket C, through which the deposits in the same may be taken out.

$m$ is a vertical pipe or conductor leading from the pocket C into the conductor G, which latter opens into the center of the chamber $o$, in which revolve the arms $r$ and fans $q$ of the draft-wheel, whose axle P is driven by the pulley I.

$s$ is a water-tank, which is intended to be kept nearly full of water, so that the fans of the draft-wheel will dip into it, and thereby fill the chamber or chimney D with spray.

$t\ t\ t$ are three (more or fewer) inclined shelves or partitions in the chimney D, to arrest the current of air and give it a zigzag passage to the exit $u$.

There are two methods of using the above-described apparatus, the one where the metal to be separated is very fine, and the other where the material is coarser. In both cases the metal to be separated is fed in through the hopper $a$, as shown by the arrow 1 in Fig. 3.

In the first method (the valves $v$ and $w$ being shut and the valves $i$, $k$, and $n$ being open) the heavier particles of metal, when they reach the bottom of the mill or cylinder A, are driven by centrifugal force through the tangential conductor E, and drop, as shown by arrow 22 in Fig. 3, on the bottom of the pocket B, forming a heap, $y$, while the lighter particles are carried upward through the mill or cylinder A by the current of air in the direction of the arrows 2, 3, 4, and 5 into the horizontal conductor $j$, and thence downward, as shown by arrow 6, into the vertical pipe $l$, the heavier particles shooting downward by their own weight and momentum onto the bottom of the pocket C, forming the heap $x$, while the lighter particles are drawn, as shown by arrow 7, upward through the pipe $m$ and in the direction of arrow 11, through the passage G, into the chamber $o$ of the draft-wheel, and thence upward in the direction of arrows 12, 13, 14, 15, 16, and 17 through the chimney or spray-chamber D, where they are thoroughly wet down, and finally deposited on the bottom of the tank $s$, so that nothing but air and mist will escape at the exit $u$ into the atmosphere. To prevent any portion of fine floating dust from escaping from the pipe $m$ into the chamber C a current of air is admitted through the windage-door $n$, which by external atmospheric pressure causes an upward movement of air in the direction of the arrows 9 and 10 into the pipe $m$, as represented in Fig. 3. This upward auxiliary current has the effect of a screen.

In the second method of operating—i. e., where the material to be separated is coarser—the heavier particles of metal, on reaching the bottom of the mill, are driven by centrifugal force through the tangential conductor E into the pocket B, as in the first method above described. In this second method, however, (the ports $i$ and $k$ being shut and $v$, $w$, and $n$ being open,) the lighter particles will be carried by the descending current of air (which enters at the top of the mill through the air-port $v$) in the direction of the red arrows 18, 19, and 20, through the mill A and the conductor E, into the pocket B, and thence upward in the direction of arrow 21 into the pipe F, from which they are discharged into the shorter vertical pipe $l$, and through it into the longer vertical pipe $m$, the heavier particles moving downward by their own weight and momentum in the direction of the arrow 8 to the bottom of the pocket C, where they are deposited in the heap $x$, while the lighter particles take the direction of the arrow 7 and upward through the pipe $m$, and thence into the spray-chamber, as described in the first method of operating, the current of air sucked in through the windage-port $w$ keeping the dust from collecting in the pocket B, and the current through the windage-port $n$ preventing the dust from collecting in the pocket C.

The drawings represent only two pockets, B and C, and two pipes, $l$ and $m$, leading into and out of the latter. It is obvious, however, that the upper end of the pipe $m$ might lead into another pipe similar to $l$ over another pocket similar to C, and thence into another ascending pipe, and so on, forming a series of pipes and pockets, by means of which the process of separation may be carried on to any required extent, each succeeding pocket receiving a finer grade of deposit than the preceding. For most purposes, however, the number shown in the drawings, together with the spray-chamber, will be found sufficient.

It is also obvious that the pipes $l$ and $m$, instead of being vertical, may be inclined or even horizontal, and yet accomplish indifferently well the object required. We prefer, however, to construct them substantially as shown in Fig. 3.

We disclaim the removal of the pulverized material through a central opening about the shaft or axis of the mill, the same having already been patented by us September 30, 1862; but What we do claim as new, and desire to secure by Letters Patent, is—

1. The separating of metals from mixtures of earth and metal by the application of gravity in counter action to currents of air in an upright pulverizing-mill, the air moving upward to carry off the finer dust of earthy matter, while the metal falls by its superior gravity, substantially as described.

2. The tangential conductor E, leading from the periphery of the mill, in combination with the pocket B or its equivalent, substantially as and for the purpose described.

3. The shorter pipe $l$ within the larger and longer pipe $m$, when arranged in reference to the mill A and pocket C, or their equivalents, substantially as set forth, and for the purpose described.

4. The employment of a water-tank and a draft and spray wheel, substantially as set forth, and for the purpose described.

5. The pipe F, in combination with the pocket B, pipes $l$ $m$, and pocket C, substantially as and for the purpose described.

6. The windage-port $w$ in the pocket B, substantially as and for the purpose described.

7. The windage-port $n$ in the pocket C, substantially as and for the purpose described.

8. The air-port $v$, in combination with the mill A, tangential conductor E, pocket B, and pipe F, substantially as and for the purpose described.

9. The valves $k$ and $i$ at the top and bottom of the mill, to change the direction of the currents of air through the same, substantially as described.

10. The shelves or partitions $t$, arranged in the exit or chimney D, substantially as and for the purpose described.

JAMES D. WHELPLEY.
JACOB J. STORER.

Witnesses:
N. AMES,
GEO. R. CLARKE.